United States Patent
Ishikawa et al.

(10) Patent No.: US 11,964,516 B2
(45) Date of Patent: Apr. 23, 2024

(54) PNEUMATIC TIRE

(71) Applicant: BRIDGESTONE CORPORATION, Tokyo (JP)

(72) Inventors: Naoko Ishikawa, Tokyo (JP); Yasuo Himuro, Tokyo (JP); Sotaro Iwabuchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 364 days.

(21) Appl. No.: 17/415,232

(22) PCT Filed: Nov. 29, 2019

(86) PCT No.: PCT/JP2019/046889
§ 371 (c)(1),
(2) Date: Jun. 17, 2021

(87) PCT Pub. No.: WO2020/129579
PCT Pub. Date: Jun. 25, 2020

(65) Prior Publication Data
US 2022/0063348 A1 Mar. 3, 2022

(30) Foreign Application Priority Data
Dec. 18, 2018 (JP) .................................. 2018-236003

(51) Int. Cl.
*B60C 13/00* (2006.01)
(52) U.S. Cl.
CPC .................... *B60C 13/001* (2013.01)

(58) Field of Classification Search
CPC ..... B60C 13/00; B60C 13/001; B60C 13/002; B60C 13/02
See application file for complete search history.

(56) References Cited

U.S. PATENT DOCUMENTS

| 5,645,661 A | 7/1997 | Clementz et al. |
| 6,253,815 B1 | 7/2001 | Kemp et al. |
| (Continued) | | |

FOREIGN PATENT DOCUMENTS

| CN | 1286661 A | 3/2001 |
| CN | 102612440 A | 7/2012 |
| (Continued) | | |

OTHER PUBLICATIONS

Machine translation: JP-09086106-A, Kotani M, (Year: 2023).*
(Continued)

*Primary Examiner* — Kendra Ly
(74) *Attorney, Agent, or Firm* — Oliff PLC

(57) ABSTRACT

A pneumatic tire including: a tread portion is in contact with a road surface; and a side wall portion is continuous to the tread portion and positioned inside a tire radial direction of the tread portion. A large region including a plurality of small regions having different arithmetic average roughness outside in a tire width direction is formed on outer surface of the side wall portion. A plurality of large regions are formed along a tire circumferential direction and the tire radial direction. In a boundary line of adjacent large region, small regions having different arithmetic average roughness come into contact with each other.

2 Claims, 8 Drawing Sheets

(56) References Cited

U.S. PATENT DOCUMENTS

| | | | |
|---|---|---|---|
| 2012/0273101 A1* | 11/2012 | Iwabuchi | B60C 5/00 |
| | | | 152/151 |
| 2013/0075005 A1* | 3/2013 | Sato | B60C 13/001 |
| | | | 152/523 |
| 2013/0228261 A1 | 9/2013 | Nakamura | |
| 2014/0326385 A1 | 11/2014 | Sato | |
| 2016/0137007 A1 | 5/2016 | Murata | |
| 2019/0023081 A1 | 1/2019 | Iwabuchi et al. | |

FOREIGN PATENT DOCUMENTS

| | | | | |
|---|---|---|---|---|
| CN | 103167962 A | | 6/2013 | |
| CN | 108430806 A | | 8/2018 | |
| DE | 102016218487 A1 | | 3/2018 | |
| GB | 2008062 A | | 5/1979 | |
| JP | 09086106 A | * | 3/1997 | B60C 13/001 |
| JP | 2008-273505 A | | 11/2008 | |
| JP | 2008273505 A | * | 11/2008 | B29D 30/0606 |
| JP | 2011-105231 A | | 6/2011 | |
| JP | 2011-255803 A | | 12/2011 | |
| JP | 2012-101754 A | | 5/2012 | |
| JP | 2013-071572 A | | 4/2013 | |
| JP | 2015-000613 A | | 1/2015 | |
| JP | 2016-084041 A | | 5/2016 | |
| JP | 2017-001418 A | | 1/2017 | |
| JP | 2017-132296 A | | 8/2017 | |

OTHER PUBLICATIONS

Machine Translation: JP-2008273505-A, Nakatsu R, (Year: 2024).*
Feb. 18, 2020 International Search Report issued in International Patent Application No. PCT/JP2019/046889.
Jul. 18, 2022 Search Report issued in European Application No. 19900699.0.
Aug. 2, 2022 Search Report issued in Chinese Application No. 201980084154.4.

* cited by examiner

PNEUMATIC TIRE

TECHNICAL FIELD

The present invention relates to pneumatic tires.

BACKGROUND ART

There has been known a technique for making unevenness present on an outer surface of a side wall portion inconspicuous (Patent Document 1). A plurality of circumferential pattern element arrays in which a plurality of pattern elements having the same contour shape are continuously provided in a tire circumferential direction and a plurality of radial pattern element arrays in which a plurality of pattern elements are continuously provided in a tire radial direction are formed on the side wall portion in Patent Document 1.

CITATION LIST

Patent Literature

[Patent Document 1] Japanese Patent Application Publication No. 2013-71572

SUMMARY OF INVENTION

Technical Problem

In recent years, as demands for environmental protection increase, further weight reduction of tires is required. As an example method of reducing the weight of the tires, it is known to thin down the gauge thickness of the side wall portion. However when the gauge thickness of the side wall portion is thinned down, the unevenness is not formed deeply and it is difficult to improve an appearance of the side wall portion.

In view of the foregoing problem, the present invention provides a pneumatic tire that improves the appearance of the side wall portion even when the gauge thickness of the side wall portion is thinned down.

Solution to Problem

A pneumatic tire (pneumatic tire 1) according to the present invention comprising: a tread portion (tread portion 2) is in contact with a road surface; and a side wall portion (side wall portion 3) is continuous to the tread portion and positioned inside a tire radial direction of the tread portion. A large region (large region 10) comprising a plurality of small regions (small regions 11, 12 and 13) having different arithmetic average roughness outside in a tire width direction is formed on outer surface of the side wall portion. A plurality of large regions 10 are formed along a tire circumferential direction and the tire radial direction. In a boundary line of adjacent large region 10, small regions having different arithmetic average roughness come into contact with each other.

Advantageous Effects of Invention

According to the present invention, even when the gauge thickness of the side wall portion is thinned down, the appearance of the side wall portion is improved.

DESCRIPTION OF EMBODIMENTS

Hereinafter, an embodiment of the present invention will be described with reference to the drawings. In the illustration of the drawings, the same constituents are denoted by the same reference signs, and description thereof is omitted.

(1) Overall Schematic Configuration of a Pneumatic Tire

Figure 1:
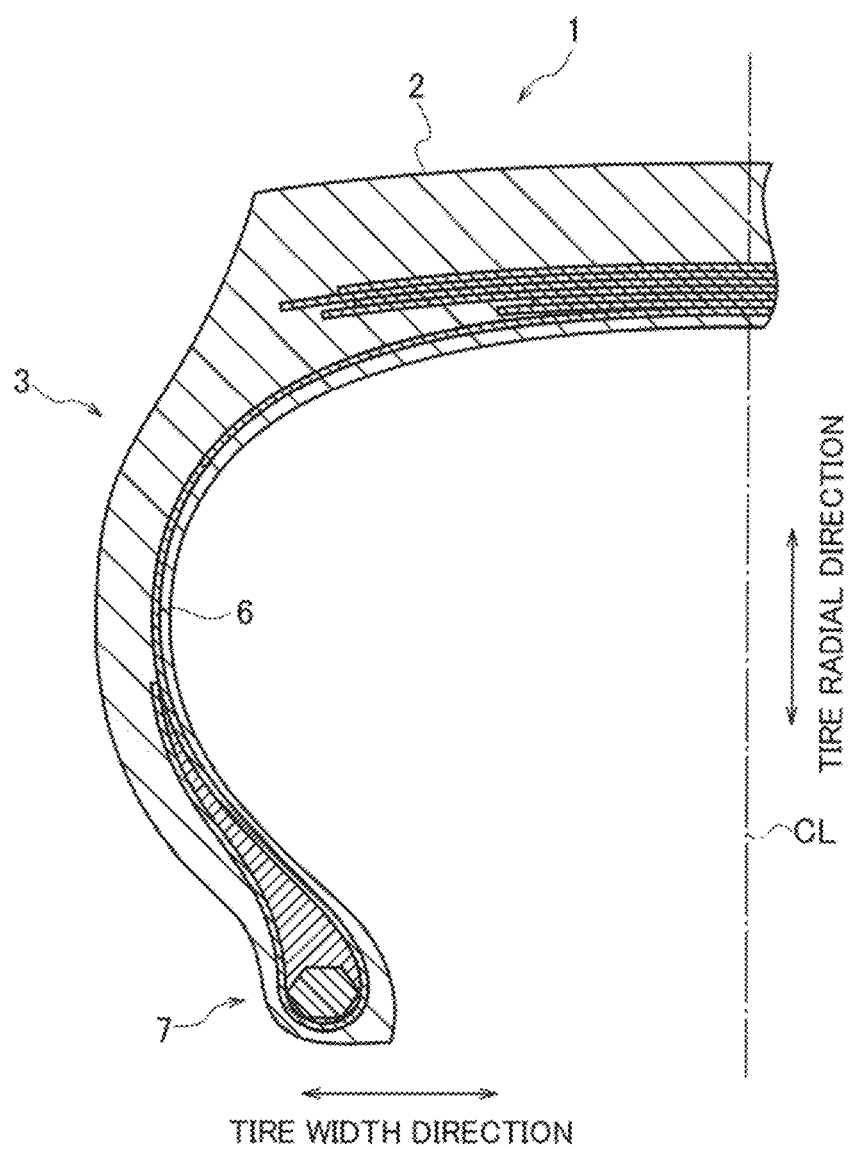
FIG. 1 is a cross-sectional view of a pneumatic tire along in a tire width direction and a tire radial direction.
Figure 2:
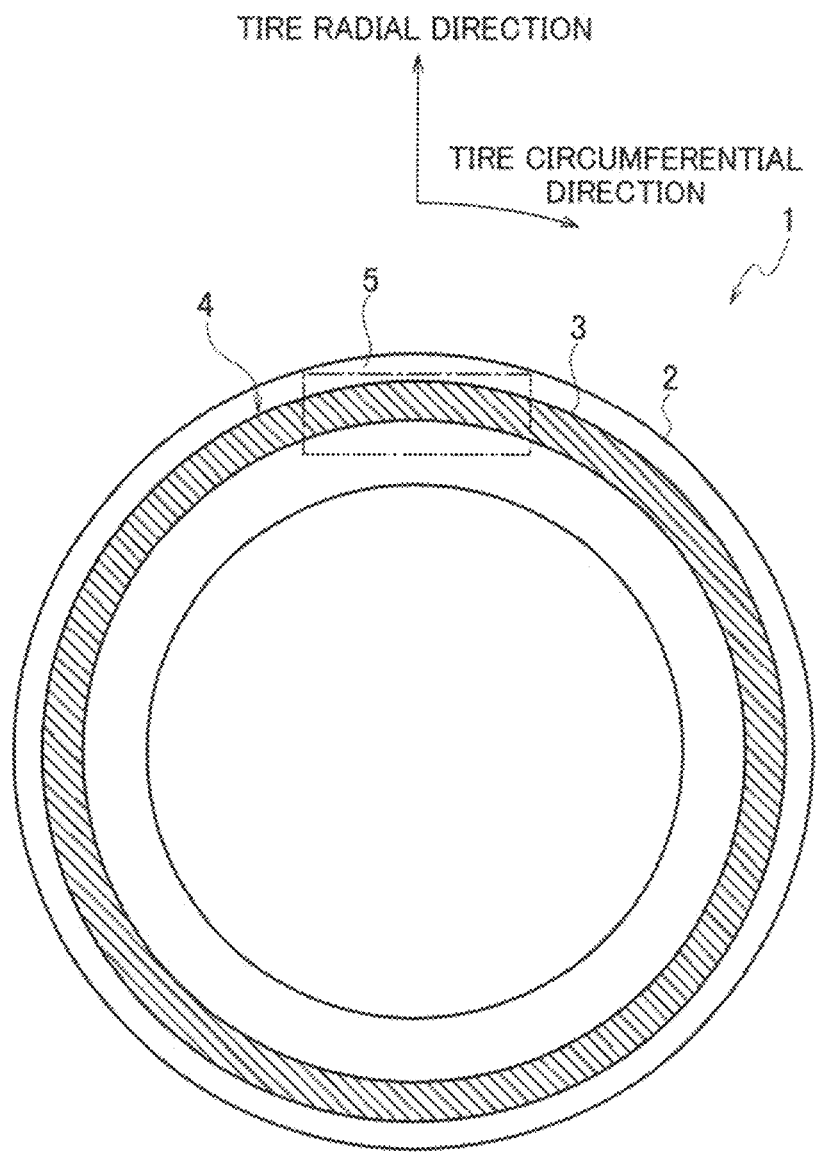
FIG. 2 is a side view of the pneumatic tire.

FIG. 1 is a partial sectional view of a pneumatic tire 1 according to the present embodiment. Specifically, FIG. 1 is the sectional view of the pneumatic tire 1 along a tire width direction and a tire radial direction. FIG. 1 shows only one side with respect to a tire equator line CL. FIG. 2 is a side view of the pneumatic tire 1 according to the present embodiment.

As shown in FIGS. 1 to 2, the pneumatic tire 1 includes a tread portion 2, a side wall portion 3, a carcass 6, and a bead portion 7.

The tread portion 2 is in contact with a road surface (unillustrated). In the tread portion 2, a pattern (unillustrated) corresponding to usage environment of the pneumatic tire 1 or the kind of a vehicle to be mounted is formed.

The side wall portion 3 is continuous to the tread portion 2 and positioned inside the tire radial direction of the tread portion 2. The side wall portion 3 is a region from the tire width direction outside end of the tread portion 2 to the upper end of the bead portion 7.

The carcass 6 forms a skeleton of the pneumatic tire 1. The carcass 6 has a radial structure having carcass cords (unillustrated) radially arranged along the tire radial direction. However, the carcass 6 is not limited to the radial structure, and may be a bias structure in which the carcass cords are arranged so as to cross each other in the tire radial direction.

The bead portion 7 is continuous to the side wall portion 3 and positioned inside the tire radial direction of the side wall portion 3. The bead portion 7 is annular, and the carcass 6 is folded back from the inside in the tire width direction to the outside in the tire width direction through the bead portion 7.

As shown in FIG. 2, a decorative region 4 (first decorative region) is formed on outer surface of the side wall portion 3. The decorative region 4 is annularly formed along the tire circumferential direction. Although the details of the decorative region 4 will be described later, a large number of large regions 10 are formed in the decorative region 4. A place where the decorative region 4 is formed includes tire maximum width.

Figure 3:
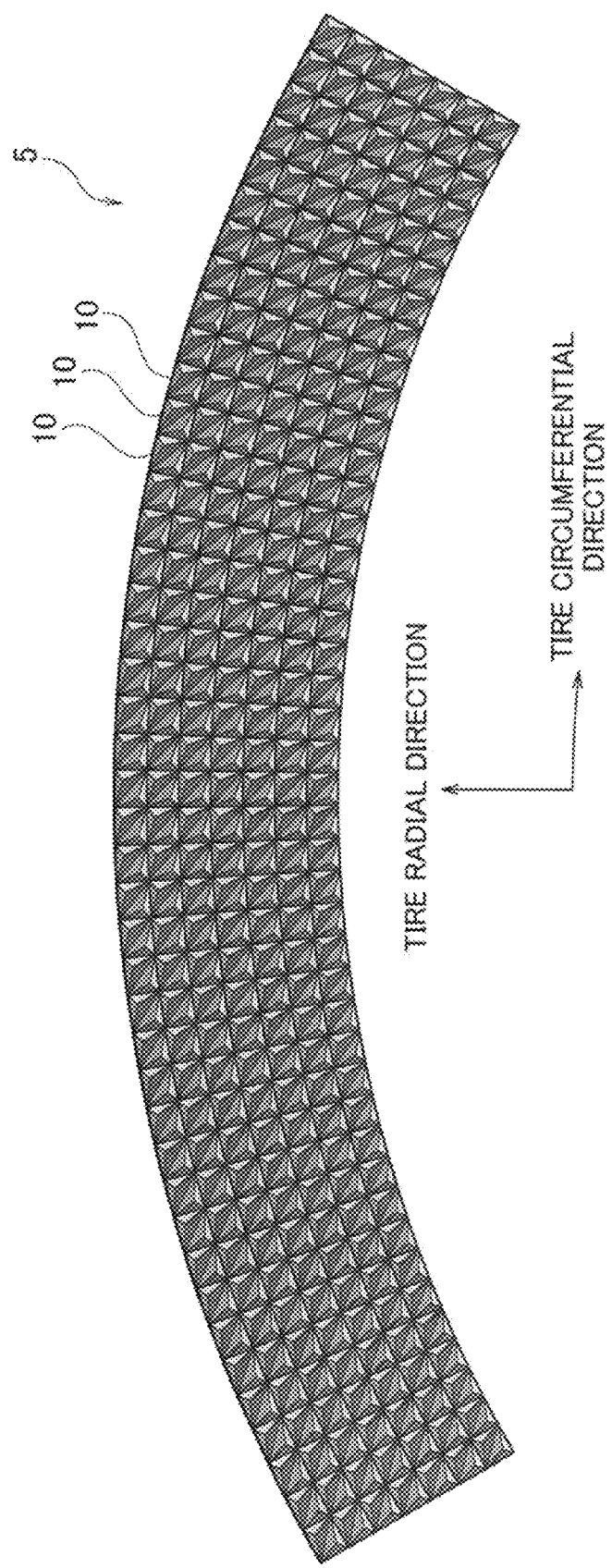
FIG. 3 is a partially enlarged view of FIG. 2.

Next, with reference to FIG. 3 a partial area (a dashed area 5 shown in FIG. 2) of the decorative region 4 shown in FIG.

2 will be described. FIG. 3 is an enlarged view of the region 5 shown in FIG. 2. As shown in FIG. 3, the decorative region 4 comprises a plurality of large regions 10. The plurality of large regions 10 are formed along the tire circumferential direction and the tire radial direction.

Figure 4:
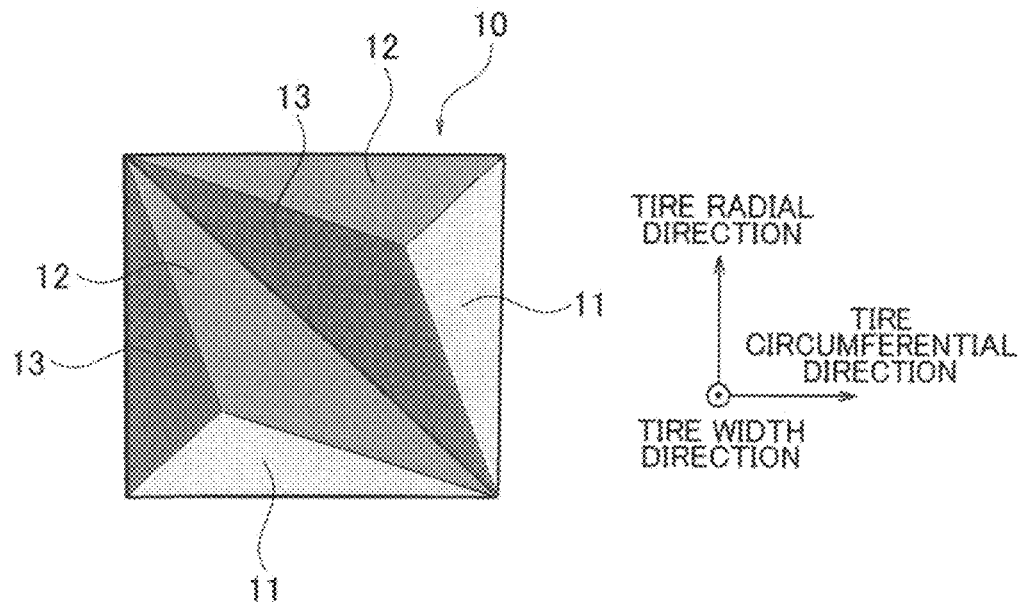
FIG. 4 is a diagram for explaining a large region according to the embodiment of the present invention.

Next, with reference to FIGS. 4 to 6, the large region 10 will be described in detail. As shown in FIG. 4, a shape of the large region 10 is quadrangular in the top view of the large region 10. However, as will be described later, the shape of the large region 10 is not limited to quadrangular. As shown in FIG. 4, the large region 10 includes a plurality of small regions (small regions 11, 12 and 13). In the top view of the large region 10, shapes of the small regions 11, 12 and 13 are all triangular. However, as will be described later, the shapes of the small regions 11, 12 and 13 is not limited to triangular. The small regions 11, 12 and 13 are processed by laser, for example.

Figure 5:
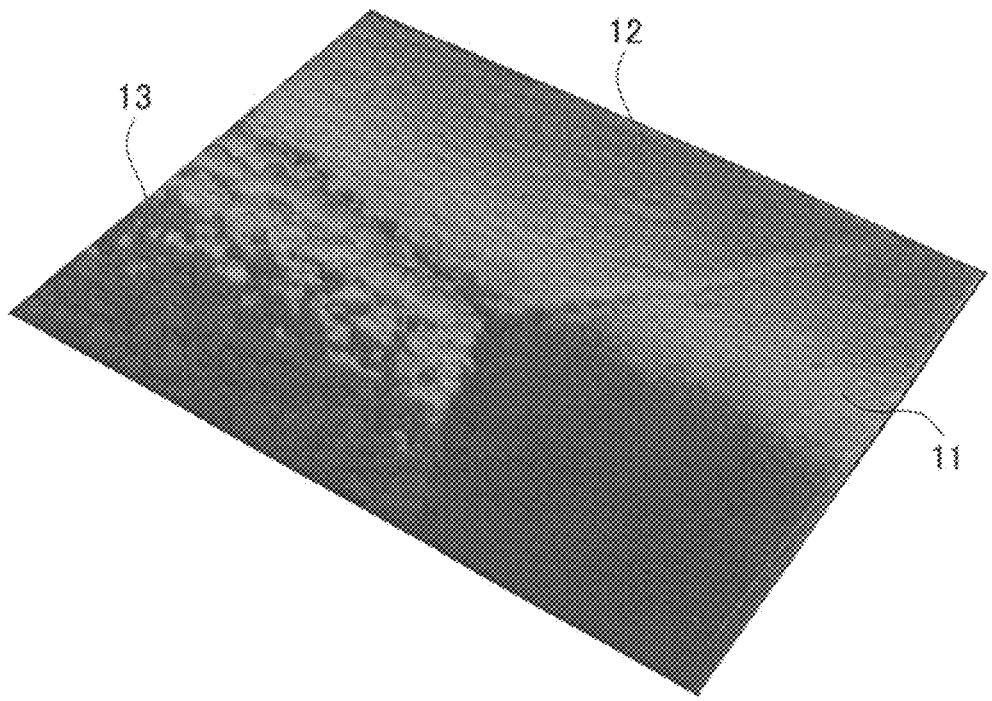
FIG. 5 is a diagram for explaining an arithmetic average roughness of a small region according to the embodiment of the present invention.

In the small regions 11, 12 and 13, an arithmetic average roughness outside in the tire width direction is different from each other as shown in FIG. 5. The arithmetic average roughness of the small region 11 outside in the tire width direction is 1.2 µm to 1.4 µm. The arithmetic average roughness of the small region 12 outside in the tire width direction is 1.5 µm to 1.8 µm. The arithmetic average roughness of the small region 13 outside in the tire width direction is 1.9 µm to 4.5 µm.

In the example shown in FIG. 4, the small regions 11, 12 and 13 form one triangular pyramid. Two of triangular pyramids are combined to form a large region 10. In other words, the large region 10 is formed by combining two small regions 11, 12 and 13.

Figure 6:
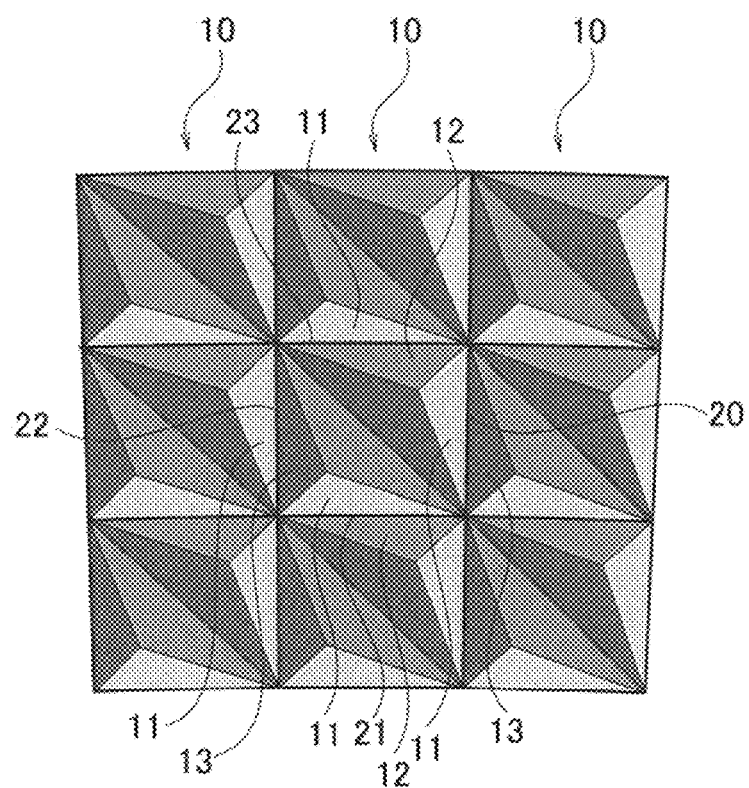
FIG. 6 is a diagram for explaining a large region according to the embodiment of the present invention.

Further, as shown in FIG. 6, the small regions having different arithmetic average roughness come into contact with each other at a boundary line of the adjacent large region 10. Reference signs 20 to 24 in FIG. 6 show the boundary lines between the large region 10 in the center of FIG. 6 and the large region 10 adjacent to this large region 10. In the boundary line 20, the small region 11 and the small region 13 are come into contact with each other. In the boundary line 21, the small region 11 and the small region 12 are come into contact with each other. In the boundary line 22, the small region 11 and the small region 13 are come into contact with each other. In the boundary line 23, the small region 11 and the small region 12 are come into contact with each other. In this way, in the adjacent large region 10, the small regions having different arithmetic average roughness come into contact with each other.

(Working and Effects)

As described above, the large region 10 comprising the plurality of small regions 11, 12 and 13 having different arithmetic average roughness outside in the tire width direction is formed on the outer surface of the side wall portion 3. The plurality of large regions 10 are formed along the tire circumferential direction and the tire radial direction. In the boundary lines of adjacent large region 10, small regions having different arithmetic average roughness come into contact with each other. The contrast caused by the difference in the arithmetic average roughness of the small regions 11, 12 and 13 produces a three-dimensional feeling with unevenness. Thus, even when the gauge thickness of the side wall portion 3 is thinned down, the appearance of the side wall portion 3 is improved.

As shown in FIG. 4, the shape of the large region 10 is quadrangular in the top view of the large region 10. The shapes of the small regions 11, 12 and 13 in the top view of the large region 10 are all triangular, and the small regions 11, 12 and 13 form one triangular pyramid. Two of triangular pyramids are combined to form a large region 10. The triangular pyramid shape enhances the unevenness, so that an user can obtain the three-dimensional feeling.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

Figure 7:
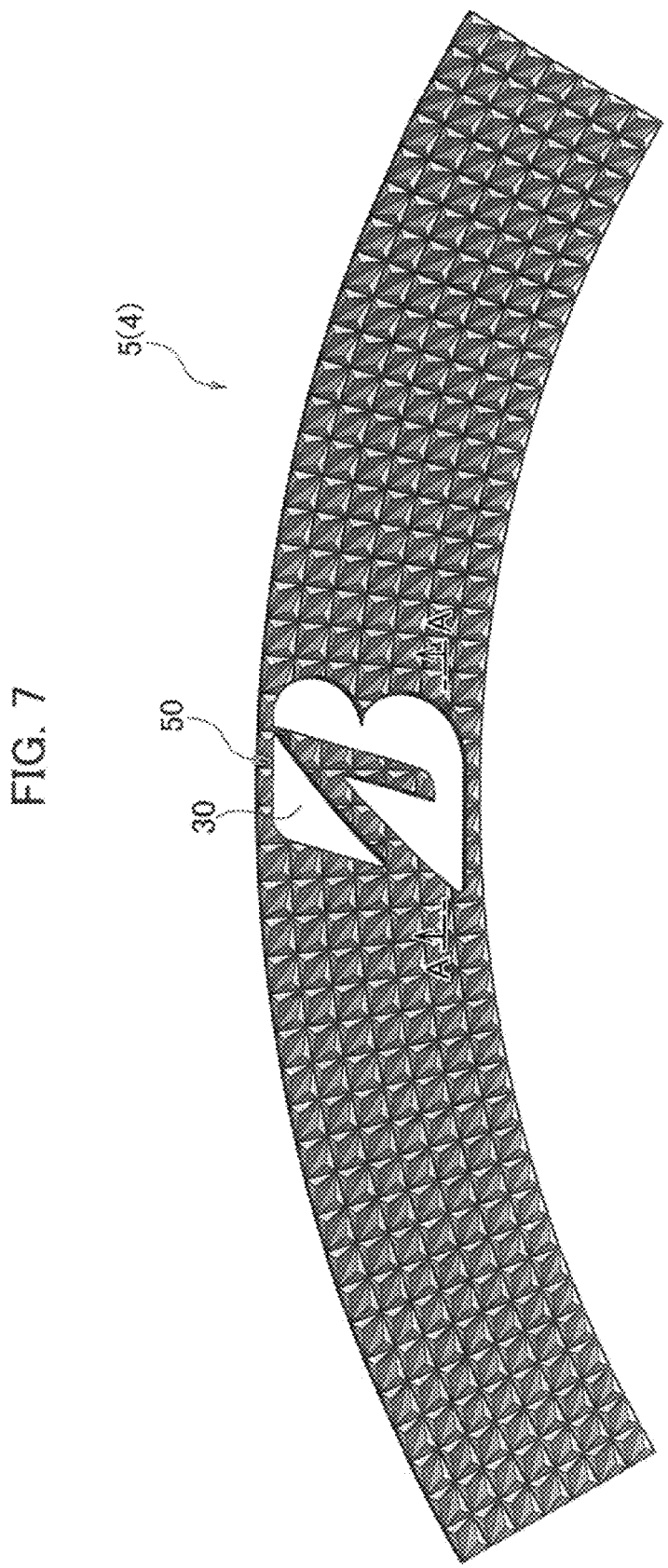
FIG. 7 is a diagram for explaining a mark according to another embodiment of the present invention.
Figure 8:
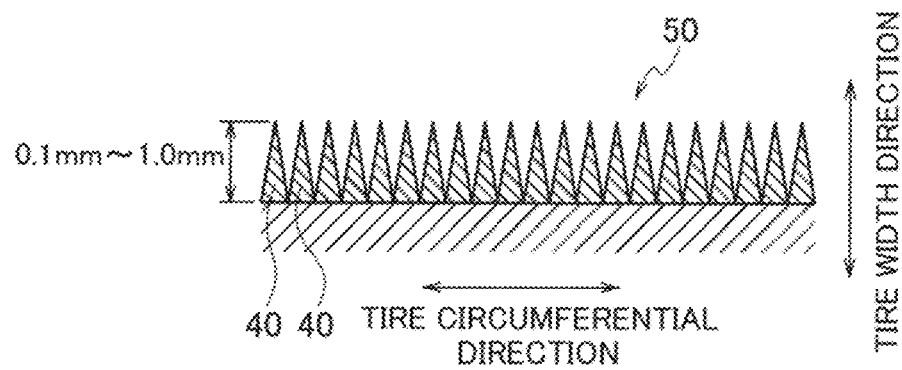
FIG. 8 is a cross-sectional view from A-A direction of FIG. 7.

For example, as shown in FIG. 7, a mark region 50 (second decorative region) different from the decorative region 4 may be formed on the outer surface of the side wall portion 3. As shown in FIG. 7, a mark 30 is formed in the mark region 50. The mark 30 is, for example, a mark. The mark 30 comprises a plurality of protrusions 40. As shown in FIG. 8, the height of the protrusion 40 is 0.1 mm to 1.0 mm, for example. Combination of the mark 30 and the large region 10 further enhances the three-dimensional feeling and the appearance of the side wall portion 3 is improved. As an example, the length of the mark 30 in the tire radial direction is 20 mm or more.

Figure 9:
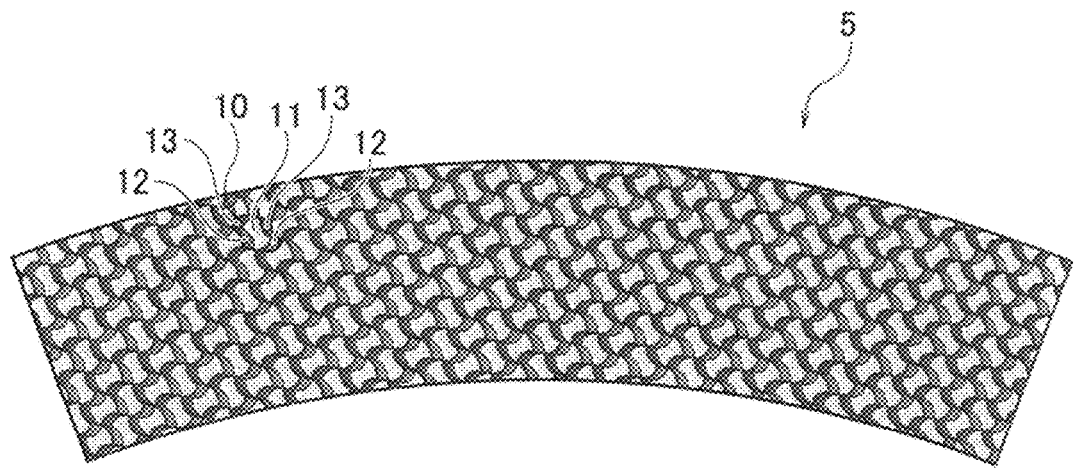
FIG. 9 is a diagram for explaining another embodiment of the present invention.
Figure 10:
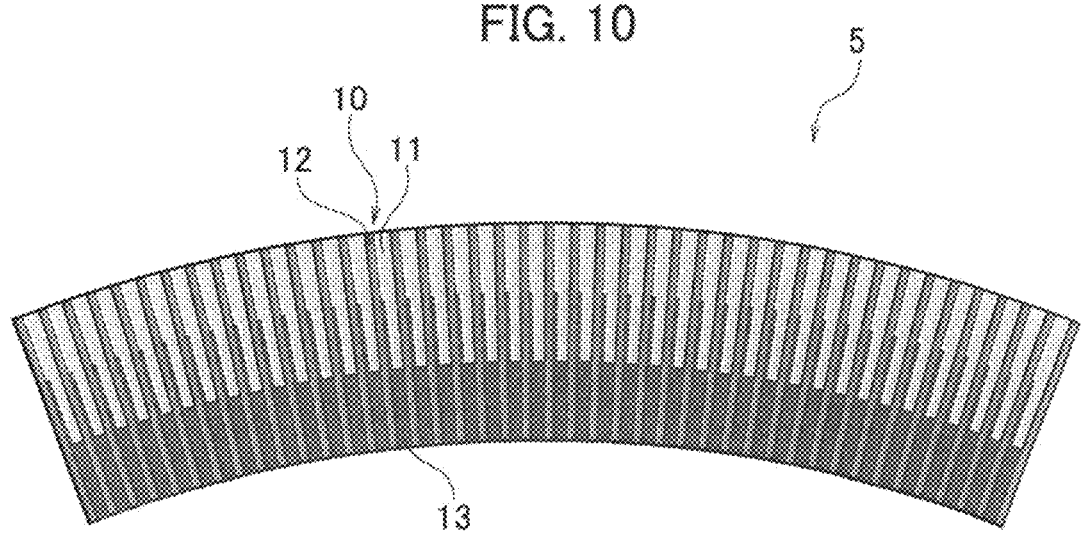
FIG. 10 is a diagram for explaining another embodiment of the present invention.

The shape of the large region 10 is not limited to quadrangular shown in FIG. 4. For example, the shape shown in FIGS. 9 to 10 may be adopted as the shape of the large region 10. Also in FIGS. 9 to 10, the arithmetic average roughness of the small regions 11, 12 and 13 is different from each other. The value of the arithmetic average roughness is the same as the value described above. In the shapes of FIGS. 9 to 10, the same effects as those described above can be obtained.

This application is based upon and claims the benefit of priority from Japanese Patent Application No. 2018-236003, filed on Dec. 18, 2018, the entire contents of which are incorporated herein by reference.

REFERENCE SIGNS LIST 1 pneumatic tire
2 tread portion
3 side wall portion
4 decorative region
6 carcass
7 bead portion
10 large region
11-13 small region
20-23 boundary line
30 mark
40 protrusion
50 mark region

The invention claimed is:

1. A pneumatic tire comprising:
a tread portion configured to be in contact with a road surface;
a side wall portion that is continuous to the tread portion and inside a tire radial direction of the tread portion, wherein
a plurality of large regions are along a tire circumferential direction and the tire radial direction,
each large region includes a first triangular pyramid and a second triangular pyramid separated by a diagonal line of the respective large region,
each triangular pyramid comprises a first small region, a second small region, and a third small region having different arithmetic average roughness in a tire width direction and formed on an outer surface of the side wall portion, the arithmetic average roughness of the first small region is 1.2 μm to 1.4 μm, the arithmetic average roughness of the second small region is 1.5 μm to 1.8 μm, the arithmetic average roughness of the third small region is 1.9 μm to 4.5 μm, in a boundary line of adjacent large regions are small regions having different arithmetic average roughness that come into contact with each other, and the second small region of the first triangular pyramid and the third small region of the second triangular pyramid face each other.

2. The pneumatic tire according to claim 1, wherein a first decorative region comprising a plurality of the large regions and a second decorative region different from the first decorative region are formed on outer surface of the side wall portion, a plurality of protrusions are formed in the second decorative region, and height of the protrusion is 0.1 mm to 1.0 mm.

* * * * *